United States Patent Office 3,810,860
Patented May 14, 1974

3,810,860
POLYMERIZATION OF CRUDE PETROLEUM HYDROCARBON
Earl N. Doyle, Houston, Tex., assignor to Petro-Form Industries (Trinidad) Ltd., San Fernando, Trinidad and Tobago, West Indies
No Drawing. Filed Apr. 12, 1972, Ser. No. 243,439
Int. Cl. C08g 22/08, 51/26, 51/36
U.S. Cl. 260—33.6 UB
49 Claims

ABSTRACT OF THE DISCLOSURE

A two-component system adapted to react to form a highly cross-linked thermosetting polymer is disclosed. The first component comprises a crude petroleum hydrocarbon and an arylene diisocyanate which is miscible with the crude petroleum hydrocarbon. The second component comprises a crude petroleum hydrocarbon, hydrogen donor and an organic acid. The hydrogen donor may be either a tertiary amine having at least one hydroxyl group or a mixture of a tertiary amine with a polyol. Both the hydrogen donor and the organic acid are miscible with the crude petroleum hydrocarbon.

Thermosetting crude petroleum polymers, such as may be prepared from the two-component system are also disclosed. Such polymers contain from 40 percent to 80 percent by weight crude petroleum hydrocarbon.

BACKGROUND OF THE INVENTION

Field of invention

The present invention relates to thermosetting polymers of crude petroleum hydrocarbons, two component systems adapted to form such polymers, and to methods of making such polymers. The polymers of the instant invention are characterized by repeating carbamate linkages connected to repeating carbamides linkages spaced by repeating aromatic linkages. Cross-linking and branching are achieved through the carbamate and carbamide groups to provide a highly branched predominantly hydrocarbon, polymer with properties similar to, but not chemically identical to, a highly cross-linked polyurethane.

Description of the prior art

Refined petroleum hydrocarbons, and to some extent crude petroleum hydrocarbons, have been used as plasticizers or extenders in many types of plastic systems. Petroleum oil extended rubbers, both natural and synthetic, are known. Petroleum oils have also been utilized as plasticizers with polyvinyl chlorides, epoxies, and polyurethanes. For example, British Pat. No. 1,145,338 discloses hydrocarbon oil extended-polyurethane resins prepared by blending hydrocarbon oil with hydroxyl-terminated diene polymers. The hydroxyl-terminated diene polymers are subsequently cured with polyisocyanates. Modern Plastics (November 1970), pp. 80–81, discloses the use of diesel fuel, heavy bunker oil, or various other oil products in relatively low amounts with an isocyanate and an undisclosed curing agent. The resulting oil-containing polymers may be formed into foams or flexible or rigid solids.

Coal tars have been utilized in coal tar-epoxy coating systems and, to some extent, in polyurethane systems. U.S. Pat. No. 3,412,050 to Elkin et al. discloses liquid polyurethane prepolymers prepared by reacting a coal tar having an active hydrogen content with an arylene diisocyanate. The reaction is carried out under nitrogen and at a temperature of about 60 to 150° C. The prepolymer may be converted to a solid reaction product by reacting with a curing agent containing active hydrogen groups.

Petroleum fractions have also been formed into polymers. U.S. Pat. No. 3,183,221 to Axe et al. discloses that rubbery polymers may be produced by heating a heavy petroleum lubricating oil, essentially free of olefinic unsaturation and containing aromatic constituents, with certain organic peroxides. It has been proposed to form polymers from a crude petroleum hydrocarbon such as crude oil by blending the crude oil with a hydrogen donor and a diisocyanate under particular conditions. Crude oil can be used in amounts of up to about 55 or 60 percent by weight of the total polymer. While acceptable polymers may be formed in this manner, the use of larger amounts of crude oil would substantially lower the total cost of the polymer.

In the system of the present invention, the crude petroleum hydrocarbons do not act as a plasticizer or extender. The diisocyanates react with hydrogen donors to produce a polymer of the same Barcol hardness whether there is no oil present or the oil is present in amounts of 40 percent, 70 percent or even 80 percent or any percentages in between.

In the system of the present invention, it is not necessary to first prepare a liquid prepolymer. The crude petroleum hydrocarbon, diisocyanate, hydrogen donor and the organic acid may be blended together at ambient temperature. Cure may be effected at any convenient temperature from −32 to greater than 100° F. or any temperature in between. The ambient temperature has little or no effect on the gel or cure rate, since the reaction is exothermic and results in a raise in temperature.

The polymers of the present invention may contain up to 80 percent by weight crude petroleum hydrocarbon. It is desirable to obtain polymers which contain such a large amount of crude hydrocarbon, because the petroleum hydrocarbons represent a relatively cheap raw material. The use of unrefined hydrocarbons also presents obvious economic benefits.

BRIEF DESCRIPTION OF THE INVENTION

One aspect of the present invention is provided by a two-component system adapted to react to form a thermosetting polymer comprising: (a) a first component comprising a crude petroleum hydrocarbon and an arylene diisocyanate which is miscible with said crude petroleum hydrocarbon, said crude petroleum hydrocarbon being present in an amount of about 5 percent to about 75 percent by weight based on the total weight of both components, and (b) a second component comprising a crude petroleum hydrocarbon, a hydrogen donor miscible with said crude petroleum hydrocarbon, said hydrogen donor selected from the group consisting of tertiary amines having at least one hydroxyl group and mixtures of a tertiary amine with a polyol containing at least two hydroxyl groups, and an organic acid miscible with said crude petroleum hydrocarbon and having a molecular weight of at least 100, said crude petroleum hydrocarbon being present in an amount of about 5 percent to 75 percent by weight based on the total weight of both components, the total amount of said crude petroleum hydrocarbon present in both components being about 40 to 80 percent by weight based on the total weight of both components, the combined amount of said diisocyanate, acid and said hydrogen donor being about 20 percent to 60 percent by weight based on the total weight of both components, the acid being present in an amount of from above about 0.10 up to about 0.25 equivalents for each equivalent of hydrogen donor, and said diisocyanate being present in an amount of 0.5 to 1.5 equivalents for each equivalent of hydrogen donor.

In another aspect, the present invention comprises a highly cross-linked thermosetting polymer formed by the reaction of: (a) a crude petroleum hydrocarbon in an amount of about 40 percent to about 80 percent by weight; (b) an arylene diisocyanate miscible with said crude petroleum hydrocarbon; (c) a hydrogen donor miscible with said crude petroleum hydrocarbon, said hydrogen donor selected from the group consisting of a tertiary amine having at least one hydroxyl group and mixtures of a tertiary amine with a polyol containing at least two hydroxyl groups; and (d) an organic acid miscible with said crude petroleum hydrocarbon, said acid having a molecular weight of at least 100 and being present in an amount of from above about 0.10 up to about 0.25 equivalents for each equivalent of hydrogen donor, said hydrogen donor, acid and said diisocyanate being present in a combined amount of about 20 percent to about 60 percent by weight, and said diisocyanate being present in an amount of 0.5 to 1.5 equivalents for each equivalent of hydrogen donor.

In still another aspect, the present invention provides the process for forming a highly cross-linked thermosetting polymer comprising: (a) providing a first component comprising a crude petroleum hydrocarbon and an arylene diisocyanate which is miscible with said crude petroleum hydrocarbon, said crude petroleum hydrocarbon being present in an amount of about 5 percent to about 75 percent by weight based on the total weight of both components; (b) providing a second component comprising a crude petroleum hydrocarbon, a hydrogen donor miscible with said crude petroleum hydrocarbon, said hydrogen donor selected from the group consisting of tertiary amines having at least one hydroxyl group and mixtures of a tertiary amine with a polyol containing at least two hydroxyl groups, and an organic acid miscible with said crude petroleum hydrocarbon and having a molecular weight of at least 100, said crude petroleum hydrocarbon being present in an amount of about 5 percent to 75 percent by weight based on the total weight of both components, the total amount of said crude petroleum hydrocarbon present in both components being about 40 to 80 percent by weight based on the total weight of both components, the combined amount of said diisocyanate, acid and said hydrogen donor being about 20 percent to 60 percent by weight based on the total weight of both components, the acid being present in an amount of from above about 0.10 up to about 0.25 equivalents for each equivalent of hydrogen donor, and said diisocyanate being present in an amount of 0.5 to 1.5 equivalents for each equivalent of hydrogen donor; and (c) reacting the first component with the second component to form the polymer.

In still another aspect, the present invention provides the process of preparing a highly cross-linked thermosetting polymer comprising reacting: (a) a crude petroleum hydrocarbon in an amount of about 40 percent to about 80 percent by weight; (b) an arylene diisocyanate miscible with said crude petroleum hydrocarbon; (c) a hydrogen donor miscible with said crude petroleum hydrocarbon, said hydrogen donor selected from the group consisting of a tertiary amine having at least one hydroxyl group and mixtures of a tertiary amine with a polyol containing at least two hydroxyl groups; and (d) an organic acid miscible with said crude petroleum hydrocarbon, said acid having a molecular weight of at least 100 and being present in an amount of from about about 0.10 up to about 0.25 equivalents for each equivalent of hydrogen donor, said hydrogen donor, acid and said diisocyanate being present in a combined amount of about 20 percent to about 60 percent by weight, and said diisocyanate being present in an amount of 0.5 to 1.5 equivalents for each equivalent of hydrogen donor.

The ratios of the various ingredients which make up the components of the various aspects of the present invention may be varied over a wide range. For example, each component of the two-component system may contain from about 5 percent to about 75 percent crude petroleum hydrocarbon.

The total amount of crude petroleum hydrocarbon in both components can be from about 40, preferably from about 60, up to about 80 percent by weight of the two components. Preferably, each component contains approximately the same amount of crude petroleum hydrocarbon. The total amount of diisocyanate, hydrogen donor and organic acid in both components can be from about 20 to about 60, preferably from about 20 to about 40 percent by weight of the two components. To achieve complete polymerization, from about 0.5 to about 1.5, preferably from about 0.8 to about 1.2, equivalents of diisocyanate should be employed for each equivalent of hydrogen donor. The organic acid is employed in an amount of from above about 0.10 to about 0.25 equivalents for each equivalent of hydrogen donor.

The present invention also contemplates the polymers obtained by mixing the two components of the two-component system. It is of course recognized that the polymers of the instant invention may be prepared merely by mixing together all of the ingredients of the two-component system without preparing two separate components or packages.

The thermosetting polymers of the instant invention comprise highly branched and highly cross-linked units of a crude petroleum hydrocarbon, an arylene diisocyanate, a tertiary amine having at least one hydroxyl group or a tertiary amine and a polyol having at least two reactive hydroxyl groups, and an organic acid having a molecular weight of greater than 100.

The polymer may contain from about 40 percent up to 80 percent by weight crude petroleum hydrocarbon and about 20 percent to about 60 percent by weight diisocyanate, tertiary amine, polyol and organic acid. The diisocyanate should be present in an amount of 0.5 to 1.5 equivalents for every equivalent of tertiary amine or tertiary amine plus polyol.

DETAILED DESCRIPTION OF THE INVENTION

The crude petroleum hydrocarbons suitable for use in the system of the present invention include crude oils as they are received at the well head, petroleum residues after the lighter fractions have been taken off, or portions of the lighter fractions such as bunker oil or No. 4 diesel oil. These lighter fractions are particularly useful in the form of blends with heavier fractions where it is desirable to reduce the viscosities of the heavier fractions.

To understand the nature of the reaction involved in the present invention, and the nature of the products obtained, it is necessary to examine the available reactive groups present in crude petroleum hydrocarbon such as crude oil. Extensive efforts have been made to characterize and classify the constituents of petroleum. The classification and identification of compounds presented below is representative of crude oils throughout the world:

(A) Straight chain saturates

Normal paraffins up through $n\text{-}C_{33}$ have been identified. Some paraffins through $n\text{-}C_{78}$ have been separated.

(B) Branched chain saturates

Identification of branched chain saturates is more difficult as they do not form stable complexes with urea. The number of possible isomers at $C_{40}$ is over $6.0 \times 10^{13}$. All the isomers through $C_8$ have been positively identified. Specific other compounds that have been isolated are 2-methyl, 3-methyl, 4-methyl-octane, 2,3-dimethylheptane, 2,6-dimethylheptane, 2,3,5- and 2,2,4- and 2,2,5-trimethyloctane and 2-methyl-3-ethyl-heptane, 2,6,10-trimethylundecane, 2,6,10-trimethyldodecane, pristane, and phytane. Also reported are 2-methyltetradecane, 3-methylheptadecane, 5,9-dimethyl and 4,9-dimethyltetradecane.

(C) Cyclic saturates

The cycloparaffins (or naphthenes) all have 5, 6 or 7 carbon rings. Cyclopentane, cyclohexane, cycloheptane, and many alkyl derivatives of cyclopentane and cyclohexane have been identified. Molecules with a single, long-chain substituent up to n-decylcyclo hexane have been reported, as well as polymethyl- and methylethyl-substituted molecules. Dicycloparaffins, such as cis- and trans - decahydronaphthalene and trans - bicyclo [4.3.0] nonane with one six membered and one five membered ring, have been isolated.

(D) Unsaturated hydrocarbons I

This class contains the olefins. Olefins are found mainly in Pennsylvania oils, and always in very low concentrations.

(E) Unsaturated hydrocarbons II

Aromatic compounds of almost every known type have been found in petroleum. Each of the alkylbenzenes through the twenty-two $C_{10}$ alkylbenzene isomers have been isolated. Some isomers of the $C_{11}$ and $C_{12}$ alkylbenzenes have been isolated and of the cycloalkyl aromatics, indan, three of the methylindan isomers, tetrahydronaphthalene, and three of the methyl-tetrahydronaphthalene isomers have been identified. Naphthalene and its 1- and 2-methyl derivatives and several trimethyl derivatives have been isolated. 1- and 2-ethyl, 1- and 2-propylnaphthalene, 2,3,6-trimethylnaphthalene, 2,3,6,7-tetramethylnaphthalene, and 2-tert-butylnaphthalene have been identified.

Biphenyl and its three methyl derivatives have been isolated, and some of the tetramethylbiphenyl isomers have been identified. Acenaphthene, 1,2-diphenylethane, fluorene, and several methyl derivatives or other diaromatic types are present in petroleum.

Higher aromatics include 1-, 2-, 3-, and 9-methylphenanthrene; 1-, 3-methyl-1,2-cyclopenta(a)phenanthrene; pyrene; 4-methylpyrene, and dimethylpyrenes. Anthrane and some of its homologs have been observed spectroscopically at low concentrations. Phenanthrene and its derivatives seem to predominate among the three-ring aromatic structures in petroleum. Aromatic ring systems with up to seven rings have been observed in the mass spectrometric examination of oil fractions. These rings are thought to be condensed into a single nucleus ("chicken wire structure") with various alkyl and cycloalkyl groups. 1,12-benzoperylene, coronene, and perylene have been reported.

(F) Sulfur compounds

Sulfur compounds include elemental sulfur, hydrogen sulfide, and organic compounds of sulfur. A few heterocyclic compounds may contain a mixture of sulfur, nitrogen, and/or oxygen compounds. The various types of organo-sulfurs are listed below:

alkylthiols-normal and branched alkyl groups thiol in
    1°, 2°, or 3° position
cycloalkylthiols:
    cyclopentane rings
    cyclohexane rings
benzenethiol and thiophenols
alkyl sulfides (thioalkanes): straight or branched
cyclic sulfides: 4 or 5 carbons

alkyl sulfides
mixed alkyl-cycloalkyl sulfides
dicyclic sulfides
polycyclic sulfides
alkylaryl sulfides alkylthiophenes
thienylsulfides
benzo(di)thiophenes

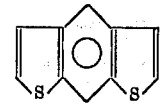

dibenzothiophenes

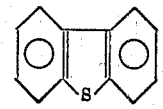

benzo(di)naphthothiophenes thiophene  and its methyl and ethyl derivatives

(G) Nitrogen compounds

Basic and non-basic compounds of the types:

pyridines and sub-pyridines
quinolines and isoquinolines and alkylated products
tetrahydroquinolines
benzoquinolines
dihydropyrindenes acridines 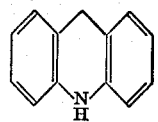 and possibly naphthoquinolines anilines carbazoles 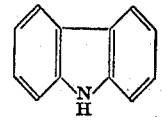 $C_1$ to $C_{10}$ substituted carbazole isomers porphyrins pyrrole 

indoles 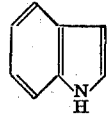

1,10-phenanthroline and isomers

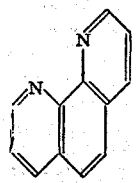

tetrahydrocarbazolenines
quinaldine

(H) Oxygen compounds carboxylic acids: fatty acids through stearic, branched
    chain, dicarboxylic, naphthenic acids
phenols
ketones dibenzofurans
lactones
esters
alcohols

(I) Trace metals

All metals through atomic number 42 have been found with the exception of rubidium (37) and niobium (41). Also detected are Ag, Cd, Sn, Ba, U, La, Ce, Nd, Er, and Yb. Some of the metals are free, some are present as organometallics, and some are associated as inorganic salts. Vanadium and nickel porphyrin coordination complexes have been identified.

(J) Resins and asphaltenes

Two portions of crude oil are still not well characterized, the resins and the asphaltenes. Petroleum resins are usually defined by the means used to separate them. The amorphous material, which is eluted from an adsorbent by alcohol or alcohol/benzene, is called the resin fraction. These resins may contain hetero molecules of nitrogen, sulfur and oxygen. In general, they have a lower molecular weight than asphaltenes and relatively more hydrogen.

Asphaltenes are nonvolatile materials insoluble in light hydrocarbons. Possibly some pyridyl, phenolic, and throphenic structures are present.

(K) Miscellaneous

Multi-hetero-atoms of nitrogen, sulfur and oxygen and porphyrins are indicated, as well as the metals associated with porphyrin structures. Asphaltenes have been suggested to consist of islands of condensed aromatic rings tied together with saturated chains or saturated rings.

Crude petroleum hydrocarbons such as crude oils may contain acidic components such as aliphatic, cyclic aliphatic (naphthenic) and aromatic acids. Not all crude oils contain naphthenic acids, a series of compounds containing a cyclopentyl and/or cyclohexyl rings and some hydroaromatic acids. A few lower aliphatic acids, as well as fatty acids, may be present in crude oils. The total acidity of crude oil varies from negligible in some paraffinic crudes to 2–3 percent in other oils. The naphthenic acids are typical carboxylic acids, similar in practically all respects to the saturated acids of similar boiling points, except for the generally slight effects of the cyclic structure on their properties.

Acid components include not only the carboxylic acids, but also the phenols. Phenols occur in almost all crude oils. In addition to phenol per se, the higher alkylated phenols are generally present. Bicyclic, polycyclic, and aromatic acids may also be present in crude oils.

Low molecular weight acids are probably formed as a result of cracking various unstable high molecular weight acids present in crude oil during distillation. For this reason, lower molecular weight acid tends to be present in a higher percentage in diesel oil than in crude oil.

The distribution of fatty acids, naphthenic acids, and phenols in crude petroleum hydrocarbons depends upon the origin of the crude oil and upon the distillation process, if any. Straight-run distillates are usually relatively rich in naphthenic and fatty acids and poor in phenols. Naphthenic acids are absent in gasolines because of the high boiling point range of naphthenic acids but are generally present in higher boiling fractions, including kersosenes and gas oils.

Sodium present in crude oil is probably bound as a salt. Other metals, such as vanadium, titanium or cobalt may exist as acid salts or as inorganic constituents. The presence of these metals acts as accelerator for the formation of polymers of crude petroleum hydrocarbons. Copper would tend to inhibit polymerization. Pyridines and quinolines, present as petroleum bases, would accelerate the polymerization reaction. Crude oils can contain from as low as 1 up to about 50 percent by weight of the crude of nitrogen compounds. About 25 to 50 percent of these nitrogen compounds are nitrogen bases such as quinoline and collidines. The remaining 50 to 75 percent of the nitrogen compounds are non-basic nitrogen components of petroleum of which little is known.

Virtually all crude oils, unrefined hydrocarbons, diesel oils, etc., are operative in the system of the present invention. It is essential that the crude petroleum hydrocarbons be compatible, i.e., miscible, with the other constituents of the system. Thus, while a particular crude petroleum hydrocarbon may not be suitable for use with a particular arylene diisocyanate, the same crude petroleum hydrocarbon may be suitable for use with another arylene diisocyanate. Similarly, an arylene diisocyanate immiscible with a particular crude petroleum hydrocarbon may be perfectly satisfactory for use with a different crude petroleum. While all crude petroleum hydrocarbons may be used with properly selected miscible reactants, certain crude petroleum hydrocarbons can be incorporated in much higher amounts than others. All crude oils, the preferred crude petroleum hydrocarbon reactant, whether paraffinic, naphthenic, aromatic, asphaltic, or mixtures of various classes of crude oils, are suitable although very light paraffinic crudes tend to float on the top of the other ingredients and present mixing problems.

Some crude petroleum hydrocarbons have a chemical composition allowing the total polymer to be as high as 80 percent by weight crude petroleum hydrocarbon, while others allow for a polymer containing less crude petroleum hydrocarbon (i.e., about 40 percent). All of the useable crude petroleum hydrocarbons can be made much more reactive by the addition of an organic acid. That is, the use of the organic acid of the type and in the amount set forth hereinbelow always allows for the incorporation into the total composition of substantially larger amounts of a given crude petroleum hydrocarbon than the same composition without the organic acid. For example, a crude petroleum hydrocarbon which may be utilized in the present invention in a total amount of about 60 percent could only be incorporated in a total amount of about 40 percent in a similar composition without the addition of an organic acid.

Crude petroleum hydrocarbons tend to be more compatible (miscible) with the hydrogen donors and diisocyanates if the crude petroleum hydrocarbons are relatively low in naphthenic carbon atoms (12 to 20 percent) and in paraffinic carbon atoms (under 35 percent). Crude petroleum hydrocarbons containing more than 20 percent naphthenic carbon atoms tend to be incompatible with tertiary amines. The higher the aromaticity, the more compatible the crude petroleum hydrocarbons tend to be with either diisocyanates or tertiary amines. Diisocyanates tend to be more compatible with crude petroleum hydrocarbons containing larger amounts of paraffinic and naphthenic carbon atoms than tertiary amines. Accordingly, in many cases, one crude petroleum hydrocarbon may be used in the first component and a different crude petroleum hydrocarbon with the second component. Such combinations have no detrimental effect on polymerization or the resulting polymer.

Highly asphaltic crude petroleum hydrocarbons are generally completely compatible in the first component but not the second component. A few selected asphaltic crude petroleum hydrocarbons from around the world have compositions which are high in polar compounds such as nitrogen bases, alcohols, acids, amines, and mercaptans. Such crude petroleum hydrocarbons are highly desirable in the system of the present invention, but may be utilized only in the first component. These high polar compounds containing crude petroleum hydrocarbons are generally of very high viscosity. In many cases, it is thus desirable to blend these crude petroleum hydrocarbons with crude petroleum hydrocarbons of lower viscosity to make the handling of the entire system easier.

In some cases, crude petroleum hydrocarbons which are very high in the reactive components result in a system which polymerizes too fast for some applications. Such crude petroleum hydrocarbons may be blended with other, less reactive crude petroleum hydrocarbons.

The approximate chemical composition of typical crude petroleum hydrocarbons which can be utilized, respectively, in amounts of about 40 percent, 60 percent and 80 percent by weight of the total polymer are shown in Table I. The component portions of the crude petroleum hydrocarbons set forth in Table I are identified with reference to the classification and identification of the paragraphs set forth above.

TABLE I

| Molecular analysis (clay-gel method) ASTM D 2007-69 | Crude 1 (about 40% by weight in polymer) | Crude 2 (about 60% by weight in polymer) | Crude 3 (about 80% by weight in polymer) |
|---|---|---|---|
| Percent by weight of— | | | |
| Asphaltenes [1] | 0-3 | 0-3 | 0-3 |
| Polar compounds [2] | 10-15 | 15-25 | 25-40 |
| Aromatics [3] | 65-80 | 60-70 | 50-65 |
| Saturates [4] | 10-20 | 6-15 | 3-12 |

[1] Paragraph J.
[2] Paragraphs F, G and H.
[3] Paragraph E.
[4] Paragraphs A, B and C.

The crude petroleum hydrocarbon material useful in the present invention should thus contain at least about 10, preferably at least 15 and most preferably at least about 25, percent by weight of polar compounds and less than about 20, preferably less than about 15, most preferably less than about 12, percent by weight of saturates. Also, the crude petroleum hydrocarbon should contain at least about 50 up to about 80 percent by weight of aromatics.

The arylene diisocyanates which may be used in the present invention are aromatic diisocyanates which may be defined by the general formula $X(NCO)_2$ wherein X is (1) a bivalent aromatic nucleus such as, e.g., phenylene, naphthylene, biphenylene, dinaphthylene, anthrylene, fluorenylene; or (2) a bivalent group consisting of two aromatic nuclei, such as those defined in (1), joined together by a bridging group such as a lower alkylene group. The effective arylene diisocyanates of the present invention have a functionality of from about 2.2 to about 2.5. The aromatic nuclei in the arylene diisocyanates used in the present invention may be unsubstituted or may contain substituents which are not reactive with isocyanate groups, such as e.g., hydrocarbon, alkoxy, halogen, cyano, nitro, sulfonyl, carbonyl groups, etc. Specific arylene diisocyanates which are suitable for use with the present invention include the following:

3,3'-biphenyl diisocyanate,
4,4'-biphenyl diisocyanate,
3,3'-dimethyl-4,4'-biphenyl diisocyanate,
2,6'-dimethyl-4,4'-biphenyl diisocyanate,
2-nitro-4,4'-biphenyl diisocyanate,
3,3'-dimethoxy-4,4'-biphenyl diisocyanate,
3,3'-dichloro-4,4'-biphenyl diisocyanate,
3-chloro-4,4'-biphenyl diisocyanate,
3,3'-diethyl-4,4'-biphenyl diisocyanate,
3,3'-diphenyl-4,4'-biphenyl diisocyanate,
3-phenyl-4,4'-biphenyl diisocyanate,
Terphenyl-4,4''-diisocyanate,
4,4'-diphenylmethane diisocyanate,
3,3'-dimethyl-4,4'-diphenylmethane diisocsyanate,
2,2'-dimethyl-4,4'-diphenylmethane diisocyanate,
3,3'-5,5'-tetramethyl-4,4'-diphenylmethane diisocyanate,
3,3'-dicyclohexyl-4,4'-diphenylmethane diisocyanate,
Diphenyl ether-4,4'-diisocyanate,
Diphenyl ether-2,4'-diisocyanate,
Diphenyl sulfone-4,4'-diisocyanate, and
Diphenyl sulfone-2,2'-diisocyanate.

The diisocyanates may be used alone or in combination with one another. The preferred diisocyanate is 4,4'-diphenylmethane diisocyanate.

The preferred hydrogen donor or curing agent is N,N,N',N' - tetrakis(2 - hydroxypropyl)-ethylenediamine. This compound is available commercially under the trade name Quadrol. Any compatible tertiary amine which contains both a tertiary nitrogen and at least one hydroxyl group may be used as the hydrogen donor. Tertiary amines containing a nitrogen to nitrogen bond are preferred and the more hydroxy groups in the compound the better. Suitable hydroxyl containing tertiary amines include, Amine 220 (2 - (8 - heptadecenyl)-2-imidazoline-1-ethanol, available from the Union Carbide Co.), triisopropanolamine, triethanolamine, N-(2-hydroxyethyl)piperazine.

Other suitable tertiary amines containing at least one hydroxyl group include the linear and branched aliphatic tertiary amines such as 2-dimethylamine-2-hydroxypropane and dialkylaminoethanol. Also suitable are the alicyclic tertiary amines such as N,N-bis(2-hydroxypropyl) piperazine; the unsaturated ring tertiary amines, such as 2,4,6-tris(dimethylaminoethyl) phenol and 2-(dimethylaminemethyl)phenol. Organic fatty acid salts of tertiary amines (such as the ethylhexoate salts of dimethylaminomethyl phenol) also work well.

Many other tertiary amines may be utilized which do not contain a hydroxyl group, if they are employed in combination with a polyol containing two or more reactive hydroxyl groups. The higher the functionality (the more hydroxyl groups present), the higher the reactivity of the system. Suitable tertiary amines which do not contain a hydroxyl group include triethylene diamine, N-ethyl morpholine, N-methyl morpholine, tributyl amine and hexamethylenetetramine.

Suitable polyols useful in conjunction with the tertiary amine include ethylene glycol, diethylene glycol, triethylene glycol, propylene glycol, dipropylene glycol hexylene glycol, 1,3-propanediol, 1,3-hexane diol, 1,5-pentane diol, 1,2-6-hexane diol, sucrose polyols, glycerol polyols etc., and combinations of polyols.

Other types of hydrogen donors besides polyols may also be employed in conjunction with the teritary amine in the system. Such hydrogen donors include castor oils, polyesters, polyethers, etc. In all cases, at least one-third by equivalent weight of the hydrogen donors added to the second component must be tertiary amines. Where the tertiary amine molecule does not have a hydroxyl group, at least one-third of the hydrogen donor should be a polyol.

Up to about 50 percent of the equivalents of the tertiary amine may be replaced amide-type of products suitable for use in polymerization of the system. Among these suitable amide-type compounds are monomethyl urea and dimethylol ureas, which contain the highly reactive tertiary amine groups, plus reactive hydroxyl sites.

Hydrogen donors with two active hydroxyl groups tend to give a more flexible, elastomeric end product, while hydrogen donors with more hydroxyl groups present, result in harder and more rigid end products. Polyols with higher molecular weights yield more flexible, elastomeric end products, while polyols of lower molecular weight give harder, more rigid end products.

Organic acids having a molecular weight of greater than 100 which are miscible with the crude oils employed have been found to be suitable in amounts of from above about 0.10 to about 0.25 equivalents for each equivalent of hydrogen donor. Naphthenic acid appears to be the most effective and commercially feasible organic acid, but a wide variety of other organic acids are also suitable. Acids proved to be effective include aliphatic carboxylic acids, unsaturated carboxylic acids, aromatic acids, and other miscellaneous organic acids. Suitable aliphatic carboxylic acids include caproic, caprylic, pelargonic, capric, lauric, palmitic, stearic, arachidic, behenic, melissic, tannic, etc. Because of the negligible effect of branching or other isomerization on the reactivity of such carboxylic acids, any aliphatic carboxylic acid from $C_6$ to $C_{22}$ or larger is effective in the system of the present invention. Mixtures of such acids, often an inexpensive source, have also proven successful. Tall oil acids in particular work well. In addition, dimer and trimer acids, such as $C_{32}$ through $C_{54}$ dicarboxylic acids, are quite effective.

Typical unsaturated carboxylic acids suitable for use include sorbic, undecylenic, oleic, ricinoleic, erucic, etc. The reactions of unsaturated acids are analogous to those of saturated acids; $C_6$ to $C_{22}$ or greater, straight chain or branched, mono- or polyunsaturated acids are effective.

Cresylic acid and phenol are quite effective, as are their higher analogues such as naphthol. Benzoic, citric and mandelic acids present compatibility problems, but may be used with crude oils with which they are miscible. Aromatic acids such as naphthoic tend to be more compatible with crude oils and work well in the system.

Other suitable acids include:

| | | |
|---|---|---|
| thiodipropionic | tetrahydrobenzoic | gyncardic |
| mercaptopropionic | tridecylic | brassidic |
| abietic | margaric | vinyl acrylic |
| itaconic | nonadecylic | eleostearic |
| sorbic | lignoceric | phenyl acetic |
| crotonic | hyenic | hydratropic |
| cinnamic | cerotic | hydrocinnamic |
| heptanoic | dimethyl acrylic | phenyl benzoic |
| astropic | ethyl crotonic | triphenyl acetic |
| hydrocarpic | hypogaeic | |
| chaulmoogric | elaidic | |

Organic acids having a molecular weight below 100 such as formic, acetic, propionic and butyric are not suitable for use in the present invention nor is acrylic acid nor the dicarboxylic acids or azelaic acid.

A few of the acids referred to above, such as caproic, caprylic, ericitic or the like, can only be dissolved in the second component with the aid of heat. However, once incorporated into the crude petroleum hydrocarbon, they remain in solution and function very well.

The crude petroleum hydrocarbon and diisocyanate of the first component and the hydrogen donor, crude petroleum hydrocarbon and the acids of the second component may be mixed together at ambient temperature and packaged. Some slight reaction may take place in either or both of the first and second component packages. However, the major reaction does not occur until the first and second components are intimately mixed together. Gel times can be as short as one second, with 80 percent polymerization in less than twenty minutes and 100 percent reaction occurring within one hour. Gel times may also be as slow as one hour, with 80 percent of polymerization occurring within 4 hours and 100 percent reaction occurring within 24 hours. The reactions will occur at ambient temperatures from $-32°$ F. to greater than $100°$ F. The highly cross-linked polymer of the present invention may be formed by blending all of the ingredients into one reactive mixture. It has been found, however, that many crude petroleum hydrocarbons react faster if the two individual component mixtures are first formulated as above.

When the diisocyanate, hydrogen donor, oil and organic acid are mixed, an exothermic reaction takes place. The reaction exotherm activates some sites in the oil constituents that are not ordinarily reactive at room temperature. The exotherm temperature may well reach $250°$ F. even in relatively thin sections, and can go as high as $450°$ F. in sections 2 to 3 inches thick.

Clearly the plethora of products and reactions associated with a complex natural product like petroleum prevents the characterization of all significant reactions which are possible with a diisocyanate. Nevertheless, the reactions which are the most probably include the reaction of diisocyanate with (1) water to form urea and $CO_2$; (2) hydroxyl groups to form urethanes; (3) amines to form disubstituted ureas; (4) urethanes to form allophanates; (5) disubstituted ureas to form substituted biuret; and (6) carboxyl groups to form amides. Other groups present in crude petroleum hydrocarbons which, if present, will react with diisocyanates include mercaptans, amino, substituted amine, carbonamide, substituted sulfonamide, sulfonamide, thiomide and sulfonic acids.

Cross-linking reactions may occur between the diisocyanates and all active hydrogen sites (including all active hydrogen sites in the hydrogen donor and crude petroleum hydrocarbon). If the stoichiometry permits, all active sites in the crude petroleum hydrocarbon react, and as the reaction exotherm goes up, more sites are activated. Additional reactive sites in the crude petroleum hydrocarbon are activated through alkylation, tertiary amino salt formation, fatty acid or a naphthenic acid or other such acid reacting with the tertiary amino, and amide formation from the acid-amine reaction. Diesel oil, which has a high percentage of napthenic rings, would lend itself to alkylation. After all the readily available chemically active sites (phenols, carboxyls, mercaptans, etc.) in the crude petroleum hydrocarbon are reacted, the predominant chemical reaction that takes place is alkylation, presumably initiated by free radical attack.

There is very little or no plasticization of the polymer through the use of up to 80 percent by weight of the total polymer of crude petroleum hydrocarbons. Above 80 percent, there is a slight amount of plasticization of the polymer as indicated by loss of hardness. Any chemical compounds in the crude petroleum hydrocarbon which cannot be reacted directly or made to react, are presumably microencapsulated in the polymer since after substantially complete polymerization, no hydrocarbon residues are found on the surface of or within the polymer. Also, the crude petroleum hydrocarbon reactant cannot be extracted from the polymer with a solvent or boiling water.

Polymers obtained in accordance with the instant invention may be very hard, rigid solids, or they may be foamed to any desired density from less than 2 lbs. per cubic foot up to that of the solid. Foams may be prepared by the addition of surfactants or blowing agents or the like using techniques known in the art. The polymers of the instant invention may also be converted to soft flexible solids or foams by the addition, to the second component, of some high molecular weight polyol adducts of ricinoleic acids (castor oils), etc.

The polymers of the instant invention have a carbamate structure with a strong hydrocarbon infra-red absorption band at 1470 $cm.^{-1}$. The polymers have excellent properties, in some cases excelling the mechanical and other properties of such conventional polymers such as urethanes and epoxides. For example, the instant polymer, in either the form of solids or foams, is more water impermeable than conventional polymers of either epoxies or polyurethanes.

The strong aromatic structure of the present polymer provides excellent high temperature properties. Heat distortion temperatures (by ASTM D 648) can be as high as $400°$ for a rigid solid, when oils of high aromaticity are utilized.

That the product polymer is highly branched and highly polymerized is shown by infrared spectroscopy, thermographs, solvent extraction testing and thermal tests. Heat/weight-loss cycles up to $450°$ F. have been conducted with no measurable weight loss. In addition, samples have been boiled in water for 7 days with no substantial weight loss or oil extraction. Barcol hardness increases as the amount of diisocyanate increases. This further indicates that not only are all reactive groups of the crude petroleum hydrocarbons involved, but also that other portions of the hydrocarbon matrix enter actively into alkylation reactions.

Compressive strengths and tensile strenghts compare very well with both epoxy and polyurethane conventional polymer systems. Impact strengths and flexural strengths surpass most conventional epoxy and polyurethane polymers. Electrical properties are very good; dielectric strengths to 550 volts/mil have been obtained. The finished polymers are also remarkably resistant to bases, acids, salts, and halogenated hydrocarbons. In addition, the polymer returns entirely to normal after extended heat exposure.

To achieve special effects, various miscellaneous ingredients may be incorporated into the polymer. Because of the extreme reactivity of the diisocyanates, such ingredients should be added to the second component. For example, catalysts may be desirable to speed up the reaction in some instances and to cause higher exotherm temperatures. Suitable catalysts include organo-metallic soaps, such as dibutyl tin dilaurate, stannous octoate, or the cobalt, tin, aluminum, titanium and zirconium soaps. Sodium and vanadium soaps also work well to increase exotherm temperatures. These catalysts may be present in minor amounts of from about 0.01 to about 0.5 percent by weight of the total weight of the two components. In some instances, highly functional aliphatic or aromatic diamines or polyamines, or fatty polyamides may be used to speed up the reaction and may be added in minor amounts, for example, of from about 0.05 to about 0.15 percent by weight of the total weight of the two components. Quaternary amonium salts enhance reactivity and heterocyclic nitrogens accelerate the reactions. These latter compounds sometimes are inherently present in crude oils.

Foams may be produced by the addition of surfactants of both the silicone and non-silicone varieties. Blowing agents include fluorocarbons, such as Freon, and many of the chlorinated solvents, such as methylene chloride. Water may be utilized in stoichiometric amounts to produce carbon dioxide as a blowing agent in many formulations. It may be desirable to use both water and a fluorocarbon as blowing agents in particular formulations. The use of water produces additional urea groups in the end polymer, providing additional sites for branching of the polymer.

Other modifiers such as ultraviolet agents, fillers, and pigments, may also be added. For example, the polymers of the present invention may be pigmented with conventional pigments to any color except pure white. Numerous suitable property control agents, fillers, etc. are known in the art. A thorough treatment of additives which could be employed with the polymers of the instant invention is found in Doyle, The Development and Use of Polyurethane Products, McGraw-Hill Book Co. (1971), page 63 et. seq. All of the solid and foam polymers of the instant invention may be rendered self-extinguishing by ASTM standards by the use of both reactive and non-reactive additives in a known manner. Fire retardance may be achieved by the use of phosphorus and bromine-based polyols as part of the hydrogen donor. Non-reactive additives containing chlorine, bromine, antimony trioxide, etc. may also be added to achieve further fire-retardance.

The present invention is further illustrated by the following examples; the examples are presented for purposes of illustration only and are not intended to be limiting.

EXAMPLES I THROUGH VIII

A number of different organic acid containing formulations were prepared by mixing the ingredients of each component at room temperature. These formulations are summarized in Table III. All ingredients are shown as parts by weight unless otherwise indicated. In each case, a first component is prepared by mixing the indicated parts by weight of 4,4'-diphenylmethane diisocyanate with the indicated parts by weight of a crude oil. A second component is prepared by mixing the indicated parts by weight of N,N,N',N'-tetrakis (2-hydroxypropyl) ethylenediamine, naphthenic acid, crude oil and a sucrose polyol (Dow Chemical Co. RS-450, a propylene oxide/sucrose compound). Other ingredients are added as indicated.

The crude oil of both components is Mobile Black Torrance, a crude oil containing about 3 percent asphaltenes, about 15 percent polar compounds, about 70 percent aromatics and about 12 percent saturates.

In each example, the two components were thoroughly mixed at room temperture to obtain polymers. The formulation of Example I resulted in a resilient polymer containing 66 percent by weight crude oil, while the formulation of Example II resulted in a rigid polymer containing 66 percent by weight oil. The formulations of Examples III, IV and V each resulted in foams containing 51 percent by weight oil. The densities of the foams of Examples III, IV and V, were, respectively, 2, 6, and 15 lbs. per cubic foot. The formulation of Example VI resulted in a fire retardant foam containing 46 percent by weight oil and having a density of 2 lbs. per cu. ft. The formulation of Example VII resulted in a water blown foam having a density of 2 lbs. per cu. ft. containing 50 percent by weight crude oil. The formulation of Example VIII resulted in a soft, open-celled foam having a density of 6 lbs. per cu. ft. The polymer contained 58 percent by weight crude oil.

TABLE II

| Ingredient | I | II | III | IV | V | VI | VII | VIII |
|---|---|---|---|---|---|---|---|---|
| First component: | | | | | | | | |
| 4,4'-diphenylmethane diisocyanate | 42.24 | 42.24 | 23.12 | 23.12 | 23.12 | 23.12 | 23.12 | 23.12 |
| Crude oil | 105 | 69 | 30.94 | 26.40 | 22.40 | 32.7 | 15.6 | 64.69 |
| Second component: | | | | | | | | |
| N,N,N',N'-tetrakis(2-hydroxylpropyl) ethylenediamine | 5.84 | 10.95 | 5.84 | 5.84 | 5.84 | 2.19 | 5.84 | 1.46 |
| Naphthenic acid | 7.6 | 4.56 | 1.52 | 1.52 | 1.52 | 1.52 | 1.52 | 1.52 |
| Crude oil | 90 | 79 | 24.64 | 25 | 24 | 19 | 23.5 | |
| Sucrose polyol | 9.92 | 16.12 | 9.92 | 9.92 | 9.92 | | 7.44 | |
| Dibutyl tin dilaurate | 0.3 | 0.2 | .04 | .04 | .04 | .04 | .04 | 0.50 |
| Castor oil | 34.0 | | | | | | | 6.40 |
| A-1 amine catalyst [1] | | | 0.2 | 0.2 | 0.2 | 0.2 | 0.2 | 0.4 |
| Silicone L-5410 [2] | | | 0.15 | 0.15 | 0.15 | 0.15 | 0.15 | 0.2 |
| Silicone Y-4499 [3] (cell opener) | | | | | | | | 0.35 |
| Freon 11 | | | 12.0 | 8.0 | 4.0 | 13.0 | | |
| R-650-X [4] | | | | | | 12.4 | | |
| Fyrol [5] | | | | | | 2.48 | | |
| Phosgard [6] | | | | | | 3.0 | | |
| Antimony trioxide | | | | | | 2.0 | | |
| Water | | | | | | | 0.18 | 0.18 |
| Polyol 2050 M.W. [7] | | | | | | | | 76.8 |

[1] Bis (2-dimethylaminoethyl ether) available from the Union Carbide Co.
[2] A commercial silicone-based cell opener available from the Union Carbide Co.
[3] A commercial silicone-based cell opener available from the Union Carbide Co.
[4] A flame retardant polyol available from the Jefferson Chemical Co.
[5] A flame retardant phosphorus-containing polyol available from the Stauffer Chemical Co.
[6] A phosphorus and chlorine-containing flame retardant polyol available from the Monsanto Chemical Co.
[7] A polyether having a molecular weight of 2,050 and an equivalent weight of 1,025 available from the Union Carbide Co.

The resilient, 66 percent oil-containing polymer of Example I and rigid, 66 percent oil-containing polymer of Example II were tested with the following results.

| Example | I | II |
|---|---|---|
| Specific gravity (ASTM D 792) | 1.09 | 1.10 |
| Coefficient of linear expansion (ASTM D 697) | 0.00019 | 0.00014 |
| Water absorption, 24 hours, percent (ASTM D 570) | 0.01 | 0.01 |
| Barcol hardness | 25 | 55 |
| Flexural modulus (ASTM D 790) | $2.4 \times 10^5$ | $5.5 \times 10^5$ |
| Compressive strength, p.s.i. (ASTM D 695) | 24,000 | 32,500 |
| Tensile strength, p.s.i. (ASTM D 638) | 5,100 | 7,460 |
| Percent elongation to break (ASTM D 638) | 24 | 14 |
| Dielectric strength, volts/mil (ASTM D 149) | 460 | 440 |
| Heat distortion, °F., 264 p.s.i | 195 | 240 |

The 51 percent oil-containing rigid foam polymers of Examples III and IV and the 45 percent oil-containing fire-retardant rigid foam of Example VI were tested with the following results:

| Example | III | IV | VI |
|---|---|---|---|
| Density, lbs. (ASTM 1564) | 1.96 | 15.64 | 1.92 |
| K factor, initial (ASTM C 177) | 0.166 | | 0.169 |
| K factor, after aging | 0.191 | | 0.193 |
| Water absorption, percent (ASTM C 272) | 0.03 | 0.01 | 0.04 |
| Water vapor transmission (ASTM E 96–E) | 0.007 | 0.003 | 0.014 |
| Compressive yield strength, parallel, p.s.i. (ASTM C 165) | 34 | 590 | 32 |
| Compressive strength, perpendicular, p.s.i. | 22 | 368 | 22 |
| Heat deflection temperature (ASTM D 648) | 144 | 162 | 156 |
| Closed cell content, in water, 24 hours, percent | 93 | | 91 |
| Flammability (ASTM D 635) | | | (¹) |
| Distance burned, inches | | | 0.4 |

¹ Self-extinguishing.

The solid rigid polymers of the instant invention may be used for castings of all types, plaques, picture frames, furniture parts, glass-reinforced parts, highly filled castings, coatings, highway patching compounds, compression-molded parts with and without glass fiber reinforcement, gears, wheels, rollers, bearings, bushings, impellers, pump housings, motor housings, TV and radio cabinets, office equipment covers, luggage, telephone instruments, containers, garbage cans, etc.

Uses for the solid elastomeric polymers of the instant invention include rubber substitutes, including automobile tires, bumpers, motor cushions, vibration dampers, power drive belting, shoe soles, heels, encapsulation and embedment of electric and electronic parts, wire sheathing and electrical insulation, chemical resistant and corrosion protective coatings, automobile undercoating, sealants and caulking compounds, etc.

The soft, open-cell foamed polymers of the present invention may be used for mattresses, cushions, pillows, seats, furniture padding, carpet backing, packaging, acoustic coating, filters, sponges, athletic equipment padding, etc.

Rigid, low density foams (2 to 6 lbs. per cu. ft.) prepared from the polymers of the instant invention may be used for thermal insulation for refrigerators, buildings, refrigerated railroad cars and trucks, ice chests, water coolers, etc., as well as soundproofing and insulation for automobiles and modular construction panels, rigidizing filler for aircraft wings and fuselages, flotation for boats and barges, construction panels for housing units, decorative plaques, synthetic wood beams, insulating road bases in arctic climates, insulating pipelines in arctic climates, insulating for storage tanks, insulation for mobile homes and campers, etc.

Rigid, high density foams (8 to 35 lbs. per cu. ft.) prepared from polymers of the instant invention can be used as wood substitutes for furniture parts, doors, cabinets, frames, and structural members for homes and buildings.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

In the claims:

1. A single article containing a two separate component system adapted to react to form a thermosetting polymer comprising:
   (a) a first component comprising a crude petroleum reactant containing at least about 10 percent by weight of polar compounds, less than about 20 percent by weight of saturates and from about 50 up to about 80 percent by weight of aromatics, said crude hydrocarbon reactant being selected from the group consisting of unrefined crude oils and partially refined crude oils having boiling points above about those of bunker oil or No. 4 diesel oil and mixtures thereof, and an arylene diisocyanate having a functionality of from about 2.2 to about 2.5 which is miscible with said crude petroleum being present in the said first component in an amount of about 5 percent to about 75 percent by weight based on the total weight of both components, and
   (b) a second component comprising a crude petroleum reactant containing at least about 10 percent by weight of polar compounds, less than about 20 percent by weight of saturates and from about 50 up to about 80 percent by weight of aromatics, a hydrogen donor miscible with said crude petroleum, said hydrogen donor selected from the group consisting of tertiary amines having at least ose hydroxyl group and mixtures of a tertiary amine with a polyol containing at least two hydroxyl groups, and an organic acid selected from the group consisting of $C_8$ to $C_{22}$ monocarboxylic acids, $C_{32}$ to $C_{54}$ polycarboxylic acids and mixtures thereof miscible with said crude petroleum and having a molecular weight of at least 100, said crude petroleum being present in said second component in an amount of about 5 percent to 75 percent by weight based on the total weight of both components,
   the total amount of said crude petroleum present in both components being about 40 to 80 percent by weight based on the total weight of both components, the combined amount of said diisocyanate, acid and said hydrogen donor being about 20 percent to 60 percent by weight based on the total weight of both components, the acid being present in an amount of from above about 0.10 up to about 0.25 equivalent for each equivalent of hydrogen donor, and said diisocyanate being present in an amount of 0.5 to 1.5 equivalents for each equivalent of hydrogen donor.

2. The article of claim 1 in which said crude petroleum of said second component is different than said crude petroleum of said first component.

3. The article of claim 1 in which said hydrogen donor is N,N,N',N'-tetrakis (2-hydroxypropyl) ethylene diamine.

4. The article of claim 3 in which said diisocyanate is 4,4'-diphenylmethane diisocyanate.

5. The two-component package of claim 1 in which the total amount of crude petroleum present in both components is at least 60 percent by weight based on the total weight of both components.

6. The article of claim 1 in which said crude petroleum is a crude oil.

7. The article of claim 1 which contains 0.8 to 1.2 equivalents of diisocyanate for each equivalent of hydrogen donor.

8. The article of claim 1 in which said acid is naphthenic acid.

9. The two-component article of claim 1 in which each of said first and second components contain about 20 percent to about 45 percent by weight crude petroleum, based on the total weight of both components.

10. The article of claim 1 wherein said crude petroleum of each component contains at least about 15 percent by weight of polar components and less than about 15 percent by weight of saturates and further wherein the crude petroleum is present in an amount of at least about 60 percent by weight based on the total weight of both components.

11. The article of claim 10 wherein said crude petroleum of each component contains at least about 25 percent by weight of polar compounds and less than about 12 percent by weight of saturates and further wherein said crude petroleum is present in an amount of about 80 percent by weight of the total weight of the two components.

12. The article of claim 1 in which said hydrogen donor is N,N,N',N'-tetrakis (2-hydroxypropyl) ethylene diamine, said diisocyanate is 4,4'-diphenylmethane diisocyanate, said organic acid is naphthenic acid and further wherein said diisocyanate is present in an amount of from 0.8 to 1.2 equivalents for each equivalent of hydrogen donor.

13. The article of claim 12 wherein said crude petroleum of each said component contains at least about 25 percent by weight of polar compounds and less than about 12 percent by weight of saturates and further wherein said crude petroleum is present in an amount of about 80 percent by weight of the total weight of the two components.

14. A highly cross-linked thermosetting polymer formed by the reaction of:
  (a) a crude petroleum reactant containing at least about 10 percent by weight of polar compounds, less than about 20 percent by weight of saturates and from about 50 up to about 80 percent by weight of aromatics in an amount of about 40 percent to about 80 percent by weight, said crude hydrocarbon reactant being selected from the group consisting of unrefined crude oils and partially refined crude oils having boiling points above about those of bunker oil or No. 4 diesel oil and mixtures thereof;
  (b) an arylene diisocyanate having a functionality of from about 2.2 to 2.5 and miscible with said crude petroleum hydrocarbon;
  (c) a hydrogen donor miscible with said crude petroleum hydrocarbon, said hydrogen donor selected from the group consisting of a tertiary amine having at least one hydroxyl group and mixtures of a tertiary amine with a polyol containing at least two hydroxyl groups; and
  (d) an organic acid selected from the group consisting of $C_6$ to $C_{22}$ monocarboxylic acids, $C_{32}$ to $C_{54}$ polycarboxylic acids and mixtures thereof miscible with said crude petroleum hydrocarbon, said acid having a molecular weight of at least 100 and being present in an amount of from above about 0.10 up to about 0.25 equivalent for each equivalent of hydrogen donor,
said hydrogen donor, acid and said diisocyanate being present in a combined amount of about 20 percent to about 60 percent by weight, and said diisocyanate being present in an amount of 0.5 to 1.5 equivalents for each equivalent of hydrogen donor.

15. The polymer of claim 14 in which said crude petroleum of said second component is different than said crude petroleum of said first component.

16. The polymer of claim 14 in which said hydrogen donor is N,N,N',N'-tetrakis (2-hydroxypropyl) ethylene diamine.

17. The polymer of claim 16 in which said diisocyanate is 4,4'-diphenyl methane diisocyanate.

18. The polymer of claim 14 in which said crude petroleum is a crude oil.

19. The polymer of claim 14 which contains 0.8 to 1.2 equivalents of diisocyanate for each equivalent of hydrogen donor.

20. The polymer of claim 13 in which said organic acid is naphthenic acid.

21. A highly cross-linking thermosetting polymer formed by the reaction of:
  (a) a crude petroleum in an amount of about 60 percent to about 80 percent by weight, said crude petroleum containing at least about 15 percent by weight of polar compounds and less than about 15 percent by weight of saturates, said crude hydrocarbon reactant being selected from the group consisting of unrefined crude oils and partially refined crude oils having boiling points above about those of bunker oil or No. 4 diesel oil and mixtures thereof,
  (b) an arylene diisocyanate having a functionality of from about 2.2 to 2.5 and miscible with said crude petroleum,
  (c) a hydrogen donor miscible with said crude petroleum, said hydrogen donor selected from the group consisting of a tertiary amine having at least one hydroxyl group and mixtures of a tertiary amine with a polyol containing at least two hydroxyl groups, and
  (d) an organic acid selected from the group consisting of $C_6$ to $C_{22}$ monocarboxylic acids, $C_{32}$ to $C_{54}$ polycarboxylic acids and mixtures thereof miscible with said crude petroleum, said acid having a molecular weight of at least 100 and being present in an amount of from above about 0.10 up to about 0.25 equivalent for each equivalent of hydrogen donor,
said hydrogen donor, acid and said diisocyanate being present in a combined amount of about 20 percent to about 40 percent by weight, and said diisocyanate being present in an amount of 0.8 to 1.2 equivalents for each equivalent hydrogen donor.

22. The polymer of claim 21 wherein said arylene diisocyanate is 4,4'-diphenyl methane diisocyanate, wherein said hydrogen donor is N,N,N',N'-tetrakis (2-hydroxypropyl) ethylene diamine and further wherein said organic acid is naphthenic acid.

23. The polymer of claim 21 wherein said crude petroleum contains at least about 25 percent by weight of polar compounds and less than about 12 percent by weight of saturates and further wherein said crude petroleum is present in an amount of about 80 percent by weight of the total weight of the two components.

24. The process of preparing a highly cross-linked thermosetting polymer comprising reacting:
  (a) a crude petroleum reactant containing at least about 10 percent by weight of polar compounds, less than about 20 percent by weight of saturates and from about 50 up to about 80 percent by weight of aromatics in an amount of about 40 percent to about 80 percent by weight, said crude hydrocarbon reactant being selected from the group consisting of unrefined crude oils and partially refined crude oils having boiling points above about those of bunker oil or No. 4 diesel oil and mixtures thereof;
  (b) an arylene diisocyanate having a functionality of from about 2.2 to 2.5 and miscible with said crude petroleum hydrocarbon;
  (c) a hydrogen donor miscible with said crude petroleum hydrocarbon, said hydrogen donor selected from the group consisting of a tertiary amine having at least one hydroxyl group and mixtures of a tertiary amine with a polyol containing at least two hydroxyl groups; and
  (d) an organic acid selected from the group consisting of $C_6$ to $C_{22}$ monocarboxylic acids, $C_{32}$ to $C_{54}$ polycarboxylic acids and mixtures thereof miscible with said crude petroleum hydrocarbon, said acid having a molecular weight of at least 100 and being present in an amount of from above about 0.10 up to about 0.25 equivalent for each equivalent of hydrogen donor,
said hydrogen donor, acid and said diisocyanate being present in a combined amount of about 20 percent to about 60 percent by weight, and said diisocyanate being present in an amount of 0.5 to 1.5 equivalents for each equivalent of hydrogen donor.

25. The process of claim 24 in which said hydrogen donor is N,N,N',N'-tetrakis (2-hydroxypropyl) ethylene diamine.

26. The process of claim 24 in which said diisocyanate is 4,4'-diphenylmethane diisocyanate.

27. The process of claim 24 in which said crude petroleum is a crude oil.

28. The process of claim 24 which contains 0.8 to 1.2 equivalents of diisocyanate for each equivalent of hydrogen donor.

29. The process of claim 24 in which said organic acid is naphthenic acid.

30. The process of claim 24 wherein the crude petroleum is reacted in an amount of about 60 percent to about 80 percent by weight.

31. The process of claim 30 wherein said crude petroleum contains at least about 15 percent by weight aromatic compounds, and less than about 15 percent by weight of saturates.

32. The process of claim 30 wherein said arylene diisocyanate is 4,4'-diphenyl methane diisocyanate, said hydrogen donor is N,N,N',N'-tetrakis (2-hydroxypropyl) ethylene diamine and further wherein said organic acid is naphthenic acid.

33. The process of claim 32 wherein said crude petroleum contains at least about 25 percent by weight of polar compounds and less than about 12 percent by weight of saturates and is present in an amount of about 80 percent by weight.

34. A process for forming a highly cross-linked thermosetting polymer comprising:
  (a) providing a first component comprising a crude petroleum reactant containing at least about 10 percent by weight of polar compounds, less than about 20 percent by weight of saturates and from about 50 up to about 80 percent by weight of aromatics, said crude hydrocarbon reactant being selected from the group consisting of unrefined crude oils and partially refined crude oils having boiling points above about those of bunker oil or No. 4 diesel oil and mixtures thereof and an arylene diisocyanate having a functionality of from about 2.2 to 2.5 and which is miscible with said crude petroleum hydrocarbon, said crude petroleum being present in the first component in an amount of about 5 percent by about 75 percent by weight based on the total weight of both components;
  (b) providing a second component comprising a crude petroleum reactant containing at least about 10 percent by weight of polar compounds, less than about 20 percent by weight of saturates and from about 50 up to about 80 percent by weight of aromatics, a hydrogen donor miscible with said crude petroleum, said hydrogen donor selected from the group consisting of tertiary amines having at least one hydroxyl group and mixtures of a tertiary amine with a polyol containing at least two hydroxyl groups, and an organic acid selected from the group consisting of $C_6$ to $C_{22}$ monocarboxylic acids, $C_{32}$ to $C_{54}$ polycarboxylic acids and mixtures thereof miscible with said crude petroleum and having a molecular weight of at least 100, said crude petroleum being present in said second component in an amount of about 5 percent to 75 percent by weight based on the total weight of both components; the total amount of said crude petroleum present in both components being about 40 to 80 percent by weight based on the total weight of both components, the combined amount of said diisocyanate, acid and said hydrogen donor being about 20 percent to 60 percent by weight based on the total weight of both components, the acid being present in an amount of from above about 0.10 up to about 0.25 equivalent for each equivalent of hydrogen donor, and said diisocyanate being present in an amount of 0.5 to 1.5 equivalents for each equivalent of hydrogen donor; and
  (c) reacting the first component with the second component to form the polymer.

35. The process of claim 34 in which said crude petroleum of said second component is different than said crude petroleum of said first component.

36. The process of claim 34 in which said hydrogen donor is N,N,N',N'-tetrakis (2-hydroxypropyl) ethylene diamine.

37. The process of claim 36 in which said diisocyanate is 4,4'-diphenylmethane diisocyanate.

38. The process of claim 34 in which said crude petroleum is a crude oil.

39. The process of claim 34 in which said acid is naphthenic acid.

40. The process of claim 34 in which each of said first and second components contain about 20 percent to about 45 percent by weight crude petroleum, based on the total weight of both components.

41. The process of claim 37 wherein said crude petroleum contains at least about 15 percent by weight of polar components and less than about 15 percent by weight of saturates and further wherein the crude petroleum is present in an amount of at least about 60 percent by weight based on the total weight of both components.

42. The process of claim 37 wherein said crude petroleum contains at least about 25 percent by weight of polar compounds and less than about 12 percent by weight of saturates and further wherein said crude petroleum is present in an amount of about 80 percent by weight of the total weight of the two compounds.

43. A process for forming a highly cross-linked thermosetting polymer comprising:
  (a) providing a first component comprising a crude petroleum reactant containing at least about 15 percent by weight of polar components, less than about 15 percent by weight of saturates and from about 50 up to about 70 percent by weight of aromatics, said crude hydrocarbon reactant being selected from the group consisting of unrefined crude oils and partially refined crude oils having boiling points above about those of bunker oil or No. 4 diesel oil and mixtures thereof and an arylene diisocyanate having a functionality of from about 2.2 to 2.5 and which is miscible with said crude petroleum hydrocarbon, said crude petroleum hydrocarbon being present in said first component in an amount of about 5 percent to about 75 percent by weight based on the total weight of both components, and
  (b) providing a second component comprising a crude petroleum reactant containing at least about 15 percent by weight of polar compounds, less than about 15 percent by weight of saturates and from about 60 up to about 80 percent by weight of aromatics, said crude hydrocarbon reactant being selected from the group consisting of unrefined crude oils and partially refined crude oils having boiling points above about those of bunker oil or No. 4 diesel oil and mixtures thereof, a hydrogen donor miscible with said crude petroleum hydrocarbon, said hydrogen donor selected from the group consisting of tertiary amines having at least one hydroxyl group and mixtures of a tertiary amine with a polyol containing at least two hydroxyl groups, and an organic acid selected from the group consisting of $C_6$ to $C_{22}$ monocarboxylic acids, $C_{32}$ to $C_{54}$ polycarboxylic acids and mixtures thereof miscible with said crude petroleum and having a molecular weight of at least 100, said crude petroleum being present in said second component in an amount of about 5 percent to 75 percent by weight based on the total weight of both components, the total amount of said crude petroleum present in both components being about 60 to 80 percent by weight based on the total weight of both components, the combined amount of said diisocyanate, acid and said hydrogen donor being about 20 percent to 40 percent by weight based on the total weight of both components, the acid being present in an amount of from above about 0.10 up to about 0.25 equivalent for each equivalent of hydrogen donor, and said diisocyanate being present in an amount of 0.8 to 1.2 equivalents for each equivalent of hydrogen donor; and (c) reacting the first component with the second component to form the polymer.

44. The process of claim 43 in which said hydrogen donor is N,N,N',N'-tetrakis (2-hydroxypropyl) ethylene diamine, said diisocyanate is 4,4'-diphenylmethane diisocyanate and further in which said organic acid is naphthenic acid.

45. The process of claim 43 wherein said crude petroleum contains at least about 25 percent by weight of polar compounds and less than about 12 percent by weight of saturates and further wherein said crude petroleum is present in an amount of about 80 percent by weight of the total weight of the two components.

46. The article of claim 6 wherein said crude oil is Mobil Black Torrance.

47. The polymer of claim 27 wherein said crude oil is Mobil Black Torrance.

48. The process of claim 27 wherein said crude oil is Mobil Black Torrance.

49. The process of claim 38 wherein said crude oil is Mobil Black Torrance.

References Cited

UNITED STATES PATENTS

| | | | |
|---|---|---|---|
| 3,390,119 | 6/1968 | Alexander | 260—18 TN |
| 3,338,861 | 8/1967 | Mastin | 260—37 N |
| 3,314,903 | 4/1967 | Belak | 260—2.5 AL |
| 3,420,791 | 1/1969 | Gurgiolo | 260—33.6 UB |
| 3,438,929 | 4/1969 | Appel | 260—18 TN |
| 3,412,050 | 11/1968 | Elkin | 260—18 TN |
| 3,182,032 | 4/1965 | Charlton | 260—18 TN |
| 3,179,610 | 4/1965 | Wood | 260—18 TN |
| 3,136,732 | 6/1964 | Kaestner | 260—33.6 UB |
| 3,755,215 | 8/1973 | Khoury | 260—2.5 AL |
| 3,747,037 | 7/1973 | Earing | 260—33.6 UB |
| 3,714,110 | 1/1973 | Verdol | 260—33.6 UB |

OTHER REFERENCES

Product Data Bulletin, Number 505; issued May 1, 1965; Sinclair Petrochemicals Inc., pp. 1 to 4, 6, 7, 13 to 17.

Kirk-Othmer Encyclopedia of Chemical Technology, vol. 15, 2nd ed., John Wiley & Sons, New York, 1968, pp. 79-88.

Bruins: Plasticizer Technology, vol. 1, Reinhold, New York, 1965, pp. 97 to 99.

DONALD E. CZAJA, Primary Examiner

C. W. IVY, Assistant Examiner

U.S. Cl. X.R.

260—2.5 AJ, 2.5 AL, 2.5 AQ, 18 TN, 77.5 R, 77.5 AM, 77.5 AQ